United States Patent
Mangu et al.

(10) Patent No.: US 6,859,774 B2
(45) Date of Patent: Feb. 22, 2005

(54) ERROR CORRECTIVE MECHANISMS FOR CONSENSUS DECODING OF SPEECH

(75) Inventors: Lidia Luminita Mangu, New York, NY (US); Mukund Padmanabhan, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 466 days.

(21) Appl. No.: 09/847,139

(22) Filed: May 2, 2001

(65) Prior Publication Data

US 2002/0165716 A1 Nov. 7, 2002

(51) Int. Cl.[7] .............................................. G10L 15/04
(52) U.S. Cl. ..................................... 704/255; 704/251
(58) Field of Search ................................ 704/246, 250, 704/236–240, 243, 251, 255, 270, 275; 329/88.01

(56) References Cited

U.S. PATENT DOCUMENTS

| | | | | | |
|---|---|---|---|---|---|
| 5,263,117 | A | * | 11/1993 | Nadas et al. ................. | 704/200 |
| 5,485,372 | A | * | 1/1996 | Golding et al. ................. | 704/9 |
| 5,638,425 | A | * | 6/1997 | Meador et al. ........... | 379/88.01 |
| 5,659,771 | A | * | 8/1997 | Golding ....................... | 715/533 |
| 5,907,839 | A | * | 5/1999 | Roth .............................. | 707/5 |
| 5,956,739 | A | * | 9/1999 | Golding et al. .............. | 715/533 |
| 6,584,180 | B2 | * | 6/2003 | Nemoto .................... | 379/88.01 |
| 6,684,201 | B1 | * | 1/2004 | Brill ............................. | 706/45 |
| 2002/0123876 | A1 | * | 9/2002 | Pokhariyal et al. ............ | 704/1 |

OTHER PUBLICATIONS

L.R. Bahl et al., "Constructing groups of acoustically confusable words," ICASSP '90, vol. 1, pp. 85–88, Apr. 1990.*

M. Weintraub et al., "Neural–network based measures of confidence for word recognition," IEEE Proc. ICASSP '97, vol. 2, pp. 887–890, 1997.*

L.R. Bahl et al., "A fast approximate acoustic match for large vocabulary speech recognition," IEEE Trans. on Speech and Audio Processing, vol. 1, No. 1, pp. 59–67, Jan. 1993.*

A.R. Golding et al., "Combining Trigram–based and feature–based methods for context–sensitive spelling correction," Proc. 34th Annual Meeting of the Association for Computational Linguistics, pp. 71–78, 1996.*

Mangu et al.,"Automatic rule acquisition for spelling correction, " Proc. 14th International Conference on Machine Learning, pp. 187–193, 1997.*

Mangu et al.,"Finding consensus in speech recognition: word error minimization and other applications of confusion networks," Computer Speech and Language 14(4), 373–400, Oct. 2000.*

(List continued on next page.)

*Primary Examiner*—Susan McFadden
(74) *Attorney, Agent, or Firm*—Ryan, Mason & Lewis, LLP; Thu Ann Dang, Esq.

(57) ABSTRACT

Techniques are described for decreasing the number of errors when consensus decoding is used during speech recognition. A number of corrective rules are applied to confusion sets that are extracted during real-time speech recognition. The corrective rules are determined during training of the speech recognition system, which entails using many training confusion sets. A learning process is used that generates a number of possible rules, called template rules, that can be applied to the training confusion sets. The learning process also determines the corrective rules from the template rules. The corrective rules operate on the real-time confusion sets to select hypothesis words from the confusion sets, where the hypothesis words are not necessarily the words having the highest score.

22 Claims, 6 Drawing Sheets

OTHER PUBLICATIONS

Brill, Eric, "Transformation–based error–driven learning and natural language processing: A case study in part of speech tagging," Computational Linguistics, vol. 21, pp. 543–565, 1995.*

Stolcke et al., "Combining words and speech prosody for automatic topic segmentation," Proc. of DARPA Broadcast News Transcription and Understanding Workshop, 1999.*

Mangu et al., "Finding consensus among words: latticed based word error minimization," Proc. of EUROSPEECH'99.*

Golding, Andrew R., "A Bayesian hybrid method for context–sensitive spelling corrections," Proceedings of the Third Workshop on Very Large Corpora 1995.*

Bahl et al., "A Maximum Likelihood Approach to Continuous Speech Recognition," IEEE Transactions on Pattern Analysis and Machine Intelligence, vol. PAMI–5, No. 2, 179–190 (Mar. 1983).

Eric Brill, "Transformation–Based Error–Driven Learning and Natural Language Processing: A Case Study in Part of Speech Tagging," Computational Linguistics, vol. 21, No. 4, 1–37 (1995).

Ted Dunning, "Accurate Methods for the Statistics of Surprise and Coincidence," Computational Linguistics, vol. 19, No. 1, 61–74 (1993).

Mangu et al., "Automatic Rule Acquisition for Spelling Correction" Computer Science Dept., Johns Hopkins University.

Mangu et al., "Finding Consensus Among Words: Lattice–Based Word Error Minimization," Department of Computer Science, Johns Hopkins University, Baltimore, MD, Speech Technology and Research Laboratory, SRI International, Menlo Park, CA.

Mangu et al., "Finding Consensus in Speech Recognition: Word Error Minimization and Other Applications of Confusion Networks," Computer Speech and Language 14, 373–400 (2000).

Ratnaparkhi et al., "A Maximum Entropy Model for Prepositional Phrase Attachment," IBM Research Division, T. J. Watson Research Center, Yorktown Heights, NY.

* cited by examiner

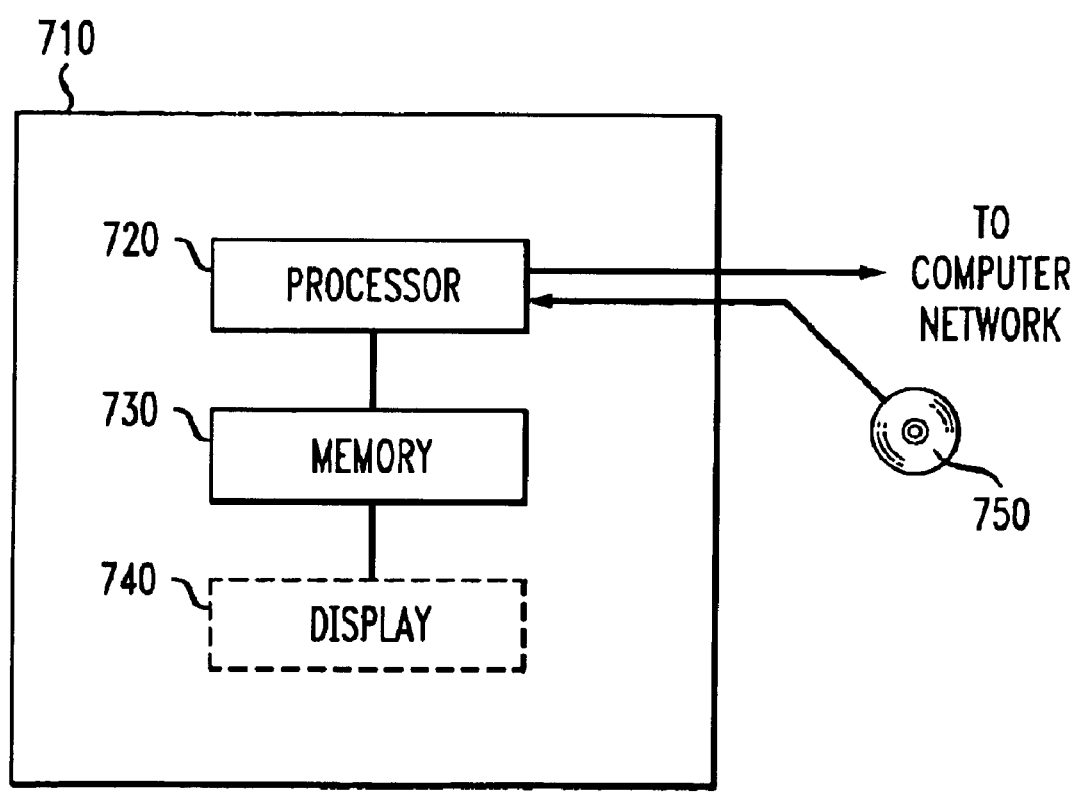

ERROR CORRECTIVE MECHANISMS FOR CONSENSUS DECODING OF SPEECH

FIELD OF THE INVENTION

The present invention relates to speech recognition and, more particularly, relates to error corrective mechanisms for consensus decoding of speech.

BACKGROUND OF THE INVENTION

In the standard Maximum Aposteriori Probability (MAP) approach to speech recognition, the goal is to find the word sequence with the highest posterior probability given the acoustic observation. Recently, a number of alternate approaches have been proposed for directly optimizing the word error rate, the most commonly used evaluation criterion. For instance, a consensus decoding approach is described in Mangu et al., "Finding Consensus in Speech Recognition: Word Error Minimization and Other Application of Confusion Networks," Computer, Speech and Language, 14(4), pp. 373–400, 2000, the disclosure of which is incorporated herein by reference.

In the consensus decoding approach, a word lattice is converted into a confusion network, which specifies the word-level confusions at different time intervals. In this system, the word with the highest score for each confusion set is selected and output. A benefit of the consensus decoding approach is that it converts extremely confusing word lattices into a much simpler form. Unfortunately, analyses of the confusion sets reveal that the word with the highest score is not always the correct word. This means that selecting the word with the highest score will result in errors. Consequently, the consensus decoding approach is not ideal.

Thus, what is needed is a way of improving speech recognition when using consensus decoding.

SUMMARY OF THE INVENTION

The present invention provides techniques for decreasing the number of errors when consensus decoding is used during speech recognition. Generally, a number of corrective rules are applied to confusion sets that are extracted during real-time speech recognition. The corrective rules are determined during training of the speech recognition system, which entails using many training confusion sets. A learning process is used that generates a number of possible rules, called template rules, that can be applied to the training confusion sets. The learning process also determines the corrective rules from the template rules. The corrective rules operate on the real-time confusion sets to select hypothesis words from the confusion sets, where the hypothesis words are not necessarily the words having the highest score.

When the corrective rules are applied to the real-time confusion sets, many of the learned corrective rules select words, in the confusion sets, that do not have the highest score. Consequently, the number of errors caused by mechanically selecting the word with the highest score is decreased.

A more complete understanding of the present invention, as well as further features and advantages of the present invention, will be obtained by reference to the following detailed description and drawings.

BRIEF DESCRIPTION OF THE DRAWINGS

FIG. 7 is a block diagram of an exemplary computer system suitable for carrying out the methods of the present invention.

DETAILED DESCRIPTION OF THE PREFERRED EMBODIMENT

Figure 1:
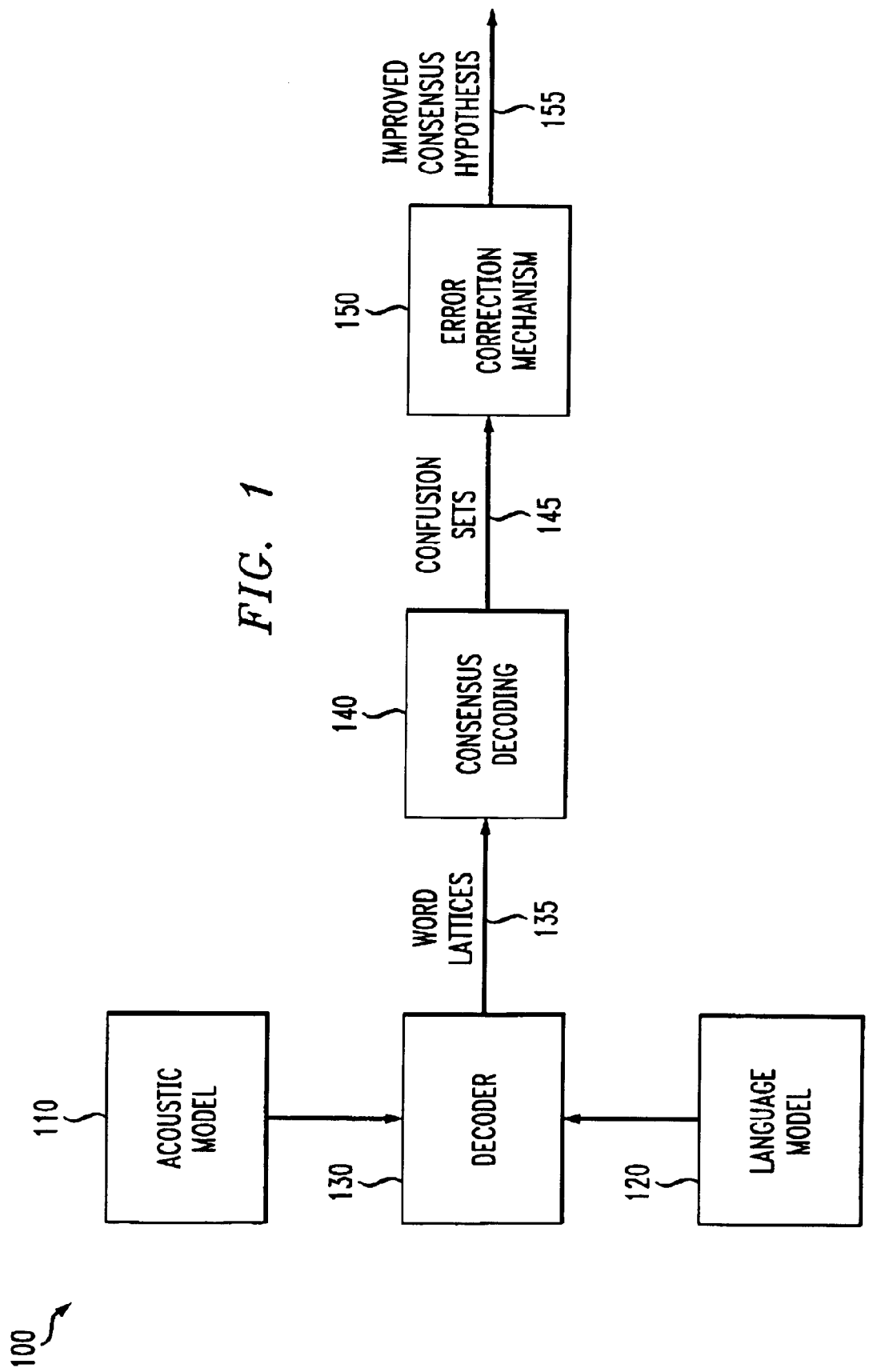
FIG. 1 is a block diagram of an exemplary speech recognition system in accordance with one embodiment of the present invention.

Referring now to FIG. 1, a block diagram is shown of an exemplary speech recognition system 100 in accordance with one embodiment of the present invention. Speech recognition system 100 comprises an acoustic model 110, a language model 120, a decoder 130, a consensus decoding module 140 and an error correction mechanism 150.

As is known in the art, in the operation of a speech recognition system, like speech recognition system 100, some acoustic information is acquired and the system determines a word or word sequence that corresponds to the acoustic information. The acoustic information is generally some representation of a speech signal, such as the variations in voltage generated by a microphone. The output of the system is the best guess that the system has of the text corresponding to the given utterance, according to its principles of operation.

The principles applied to determine the best guess are those of probability theory. Specifically, the system produces as output the most likely word or word sequence corresponding to the given acoustic signal. Here, "most likely" is determined relative to two probability models embedded in the system: an acoustic model 110 and a language model 120. Thus, if A represents the acoustic information acquired by the system, and W represents a guess at the word sequence corresponding to this acoustic information, then the system's best guess W* at the true word sequence is given by the solution of the following equation:

$$W^* = \mathrm{argmax}_W P(A|W) P(W).$$

Here P(A|W) is a number determined by the acoustic model 110 for the system, and P(W) is a number determined by the language model 120 for the system. A general discussion of the nature of acoustic and language models can be found in "Statistical Methods for Speech Recognition," Jelinek, The MIT Press, Cambridge, Mass., 1999, the disclosure of which is incorporated herein by reference. This general approach to speech recognition is discussed in the paper by Bahl et al., "A Maximum Likelihood Approach to Continuous Speech Recognition," IEEE Transactions on Pattern Analysis and Machine Intelligence, Volume PAMI-5, pp. 179–190, March 1983, the disclosure of which is incorporated herein by reference.

To determine the solution to the equation given above, a speech recognition system would proceed as follows. Decoder 130 creates a number of word lattices 135. Exemplary word lattices for a simple sentence are discussed below in reference to FIG. 2. The path through the word lattices 135 that has the highest posterior probability is selected as the most probable. The creating of word lattices 135 and the selection of the highest probability path has been the primary speech recognition process for quite some time.

Recently, however, consensus decoding 140 has been developed. Consensus decoding 140 converts word lattices 135 into confusion sets 145. Consensus decoding is discussed more particularly in Mangu et al., "Finding Consensus in Speech Recognition: Word Error Minimization and Other Application of Confusion Networks," as discussed above. Exemplary confusion sets 145 are discussed in more detail below in reference to FIG. 3. Each confusion set 145 comprises a number of words. A number of confusion sets are concatenated together to create a confusion network.

Conventional processing of confusion sets 145 is performed as follows. Each word in a confusion set is scored. Each of the highest scored words in the confusion network is selected as the most probable decoding of the acoustic event. Selecting and concatenating each word with the highest score creates a consensus hypothesis.

The embodiments of the present invention take the confusion sets 145 and apply an error correction mechanism 150 and methods to the confusion sets 145. This creates an improved consensus hypothesis 155. As will be explained in more detail below, the error correction mechanism uses a learning process to determine corrective rules. The corrective rules create an improved consensus hypothesis 155, which builds on and improves the original consensus hypothesis determined in conventional consensus decoder 140. Error correction mechanism 150 is described below in more detail in reference to FIGS. 4 through 7.

Basically, the error correction mechanism 150 improves speech decoding by selecting particular words from confusion sets. By using the corrective rules, the error correction mechanism 150 selects a word that does not have the highest score in the confusion set; instead a word having a lower score is selected. The learning process undertaken by error correction mechanism 150 allows the mechanism to learn which words, based on features of the confusion sets, should be selected.

Figure 2:
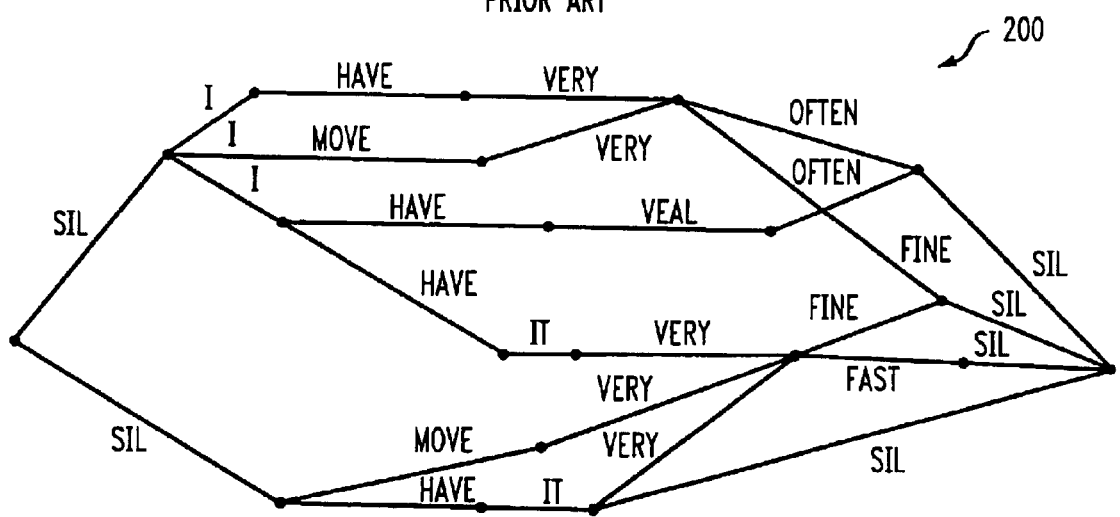
FIG. 2 shows a prior art word lattice.

FIG. 2 shows a prior art word lattice 200. Each branch of the word lattice 200 has one possible interpretation of an acoustic event and also a probability associated with it. This word lattice is determined from an acoustical event created by a person saying the sentence, "I have it very often." Normally, each possible path through word lattice 200 is traversed and the total probability for the path determined. The path with the highest probability is generally chosen as the most probable sentence.

Figure 3:
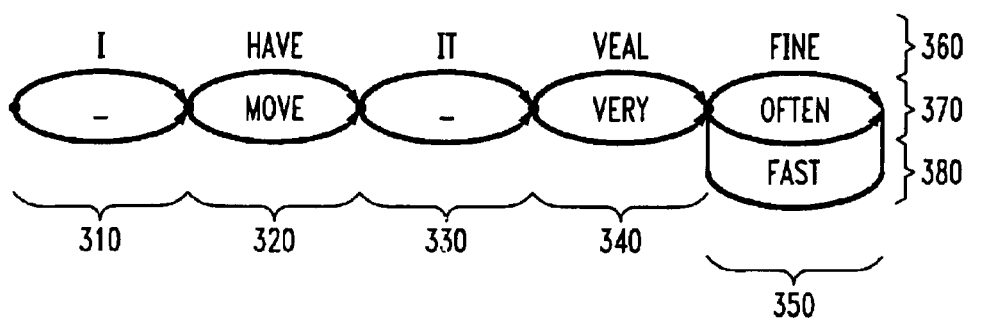
FIG. 3 shows a prior art confusion network.

FIG. 3 shows a prior art confusion network 300 that is determined from word lattice 200. Confusion network 300 has confusion sets 310, 320, 330, 340, and 350, each of which contains a number of candidate words. For instance, confusion set 310 contains candidate words "I" and "−"; the latter indicates the absence of a word, also known as a "deletion." A candidate word may be as small as a phoneme, or could be very large (e.g., a candidate word could be "ignominious"). There is also a score (not shown) associated with each word candidate. Each candidate word is sorted in order of its score. The highest scores are placed in row 360; words with lower scores are placed in row 370; and words with the lowest scores are placed in row 380. Conventional consensus decoding simply selects each word having the highest score. The conventional consensus decoding of consensus network 300 is "I have it veal fine."

The present invention improves on conventional consensus decoding by learning rules on training consensus sets and applying the rules to consensus sets determined in real-time. These rules are based on features of the consensus sets. A feature mathematically describes a characteristic of the confusion set. Exemplary features are discussed below. Any type of machine learning system may be used that can determine rules based on features. For instance, decision trees could be determined and used herein. However, it has been shown that, for a fixed set of features, transformation lists are more powerful than decision trees in what they can learn. The latter is discussed in Brill, "Transformation-based Error-driven Learning and Natural Language: A Case Study in Part of Speech Tagging," Computational Linguistics, 21(4), pp. 543–565, the disclosure of which is incorporated herein by reference.

Transformation-based learning has been applied successfully to a number of natural language problems, including part-of-speech tagging, prepositional phrase attachment, parsing and spelling correction, often achieving state-of-the-art accuracy while capturing the acquired knowledge in a small set of rules. For instance, see Mangu and Brill, "Automatic Rule Acquisition for Spelling Correction," Proceedings of the International Conference on Machine Learning (ICML), Nashville, 1997, the disclosure of which is incorporated herein by reference.

To fully specify a transformational system, a baseline predictor is specified, as is a set of allowable transformation types and an objective function for learning. In learning, the training set is first annotated based on some baseline predictor and the goal of the learner is to learn a sequence of corrective rules, also called transformations. A single iteration of the learner consists of the following steps. First, apply each possible transformation to a copy of the current training corpus and score it based on the objective function. Second, pick the rule with the highest score, append it to the end of the transformation list and apply it to the training set. The result of learning is an ordered list of transformations.

Figure 4:
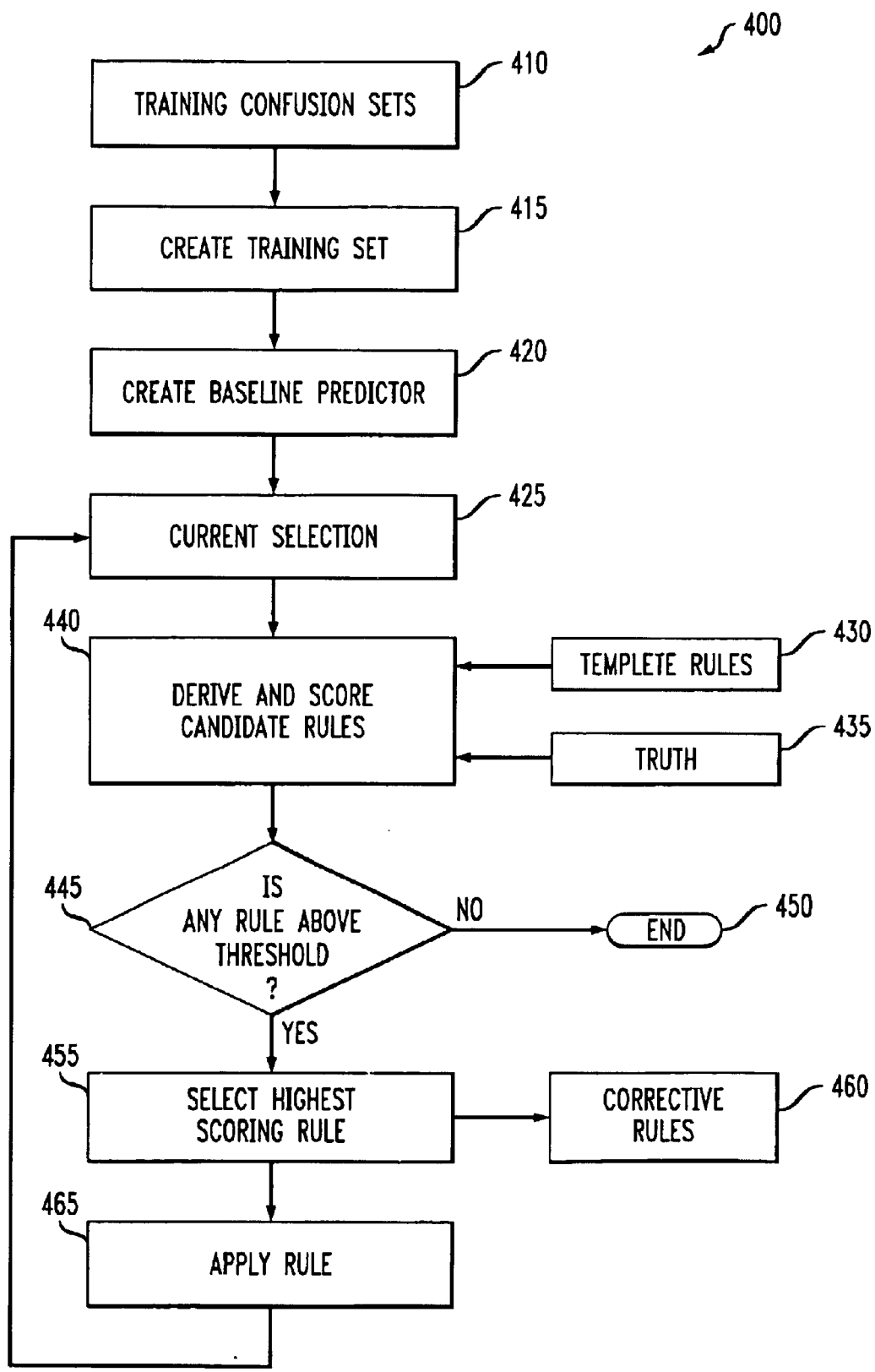
FIG. 4 is a flowchart of an exemplary method for determining corrective rules, in accordance with one embodiment of the present invention.

FIG. 4 is a flowchart of an exemplary method 400 for determining corrective rules, in accordance with one embodiment of the present invention. Method 400 uses one particular transformational learning technique; other learning techniques may also be used, such as decision trees, described in C4.5: Programs for machine learning, Ross Quinlan, 1993, or maximum entropy modeling, described in Maximum Entropy Model for Prepositional Phrase Attachment, Ratnaparkhi et al., 1996, each incorporated by reference herein. Method 400 is used whenever it is desired that a set of corrective rules for consensus sets be chosen.

Method 400 begins in step 410 when a number of training confusion sets are supplied. Generally, thousands of training confusion sets are used during training, and each confusion set is determined from speech recognition of the utterances of one or more individuals who have read scripts. Because of this, the true speech is known, and this truth provides an ideal solution that the speech recognition system attempts to achieve.

In step 415, a training set is created from the training confusion set. The training set contains, among other things, a number of features of the confusion sets. An exemplary training set is discussed below in reference to FIG. 5. In order to create a rule, features are used to mathematically describe confusion sets. The following is a list of exemplary features: (1) word identity, duration and posterior probability of two competing words for a confusion set; (2) difference in the posterior probabilities of the two top candidates; (3) temporal position of the confusion set in the sentence; and (4) number of candidates in the confusion set. In step 415, the features are determined for each confusion set.

In step 420, a baseline predictor is created. The baseline predictor is the best guess of the speech recognition system.

For conventional speech recognition systems, the best guess of the system occurs by selecting each word, of the confusion sets, having the highest score and concatenating these. This is, as discussed above, called the consensus hypothesis. For example, in FIG. 3, the consensus hypothesis is "I have it veal fine." There are different ways to represent the baseline predictor. In method 400, the two words, from each confusion set, having the highest scores are chosen as first and second classes, where "1" stands for the first class and "2" stands for the second class. The baseline predictor can therefore be represented by a series of ones and twos. A baseline predictor for FIG. 3 is thus {1, 1, 1, 1, 1}, which corresponds to "I have it veal fine."

It should be noted that a confusion set may have more than two candidates and additional words may be chosen from each of the confusion sets. However, it has been analytically determined that the first two words of a confusion set are correct a very high percentage of the time. Therefore, adding additional words as classes will achieve an error rate that is only marginally better than that achieved by having two classes.

In step 425, a modified consensus hypothesis is selected. The modified consensus hypothesis is initially the baseline predictor. Template rules are determined in step 430. Template rules are instantiated based on the training set. Each rule is of the following form:

Change $c_1$ to $c_2$ if $A_1$ op $v_1$ and $A_2$ op$_2$ $v_2$ and ... $A_k$ op$_k$ $v_k$, where $A_i$ is a feature extracted from each confusion set, having categorical or integer values $v_i$, op$_i \in \{=, <, >\}$, and $c_1, c_2 \in 1, 2$ and correspond to choosing the first or the second word candidate, respectively. For example, a rule that could be instantiated is "Choose the second candidate if the first candidate is the word 'A,' the second candidate is '--' (deletion) and the difference in posterior probabilities between the two is less than 0.1." The template rules are a superset of rules, and are every possible rule that can be instantiated based on the features and the training set.

In step 435, the truth is determined. The truth indicates the actual words that were spoken. For instance, in the consensus network 300 of FIG. 3, the actual spoken sentence was "I have it very often." There are a variety of ways of representing the truth. The way used herein is to represent the truth by a vector of numbers, where each number represents the class of the word candidate. The truth of the consensus network 300 of FIG. 3 is therefore {1, 1, 1, 2, 2}.

Step 440 uses the currently selected modified consensus hypothesis, the template rules determined in step 430 and the truth determined in step 435 to derive and score a number of candidate rules. Derivation of the candidate rules proceeds as follows. At each confusion set where the current choice is incorrect, the template rules are used to form candidate rules. The candidate rules are a subset of the template rules. The template rules are every possible rule that can be instantiated from the training set and the features. The candidate rules are those rules that can be applied to a particular confusion set.

For instance, assume that the template rule is "change class 1 to class 2 if the first candidate word is X and second candidate word is Y." If there are 10 words in the vocabulary for the consensus network, then, if a data-driven approach is not followed, a set of 10×10=100 rules would be created by instantiating all the Xs and Ys to all possible words. By following a data-driven approach, however, the present invention examines the training set and finds out that only certain words occur together in a sample. Therefore, these are the only rules that are considered. For instance, in confusion set 320, "have" and "move" are the two words in the set. Thus, the template rule is modified to become "change class 1 to class 2 if the first candidate word is 'have' and the second candidate word is 'move'."

Additionally, some template rules are not applicable to every confusion set. As an illustration, a template rule stating "change class 2 to class 1 if there are more than two candidate words and the first word has a posterior probability of less than 0.6" is not applicable to a confusion set having one or two candidate words.

Thus, step 440 filters the template rules and determines candidate rules that are specific to a confusion set. Each candidate rule is then scored in step 440 by using an objective function. All the candidate rules that have a positive effect on the current confusion set are identified. By testing each candidate rule against the rest of the training set, a count is determined of the negative and positive effects each rule creates. Each candidate rule is assigned a score based on the number of positive and negative changes caused by applying the candidate rule.

Other objective functions may be used, such as a measure based on the statistical significance of applying a rule, as described in Accurate Methods for the Statistics of Surprise and Coincidence, Ted Dunning, 1993, incorporated by reference herein.

In a transformation-based learning approach, the iterative process continues until no transformation can be found whose application results in an improvement to the training corpus. A good stopping rule found is the statistical significance of a set of candidate rules. Therefore, rules with low scores are not considered unless they are statistically significant.

Consequently, in step 445, it is determined if any rule is above a certain statistical threshold, as determined by the objective function. If not, the method ends in step 450. It should be noted that step 445 assumes that all possible candidate rules for the complete training set have been derived and scored. If each confusion set is being individually examined, then step 445 would be "Is any rule above a threshold and have all confusion sets been examined?"

In step 455, the candidate rule with the highest score is selected. This rule is output as a corrective rule in step 460. The corrective rules are those candidate rules that make statistically significant changes to the training set. In step 465, the selected candidate rule is applied to the modified consensus hypothesis. The modified consensus hypothesis then becomes the current selection in step 425. This process continues until all statistically significant rules have been determined.

Figure 5:
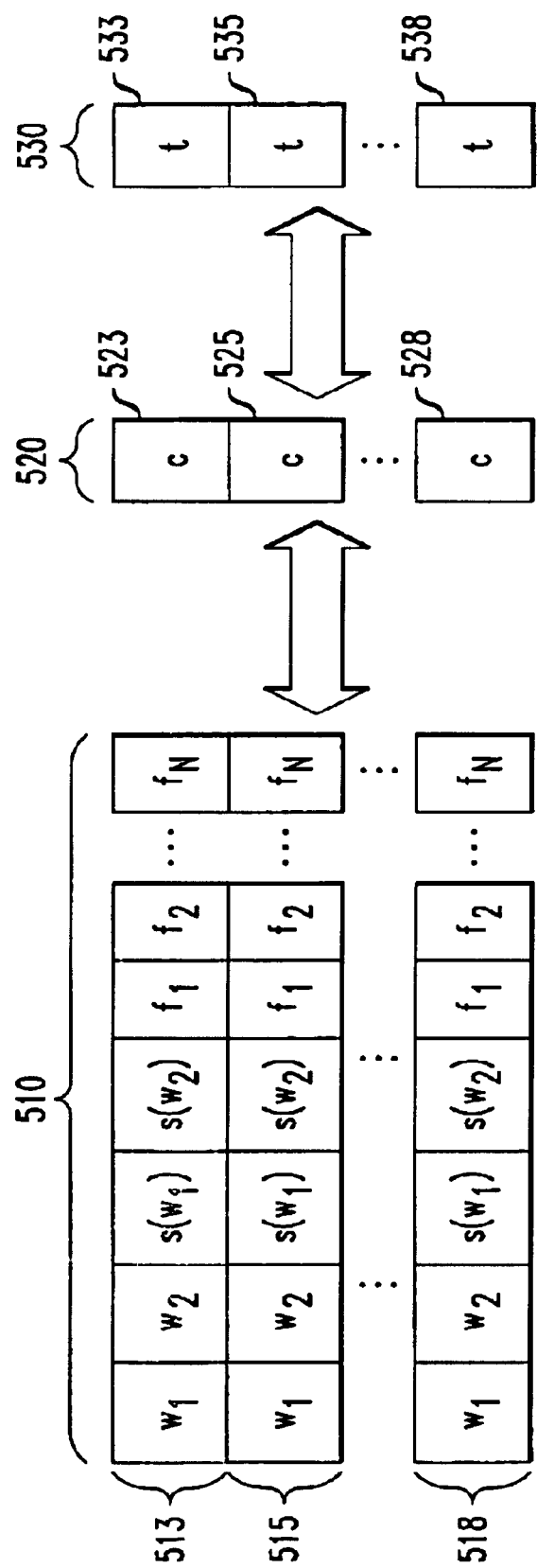
FIG. 5 is a block diagram of a training set, a current selection and a truth, in accordance with one embodiment of the present invention.

Referring now to FIG. 5, this figure shows a block diagram of a training set 510, a modified consensus hypothesis 520 and a truth 530, in accordance with one embodiment of the present invention. The training set comprises a number of entries 513, 515 and 518, each of which corresponds to a confusion set of a training confusion set. Each entry 513, 515 or 518 comprises the following: (1) two candidate words, $w_1$ and $w_2$; (2) two scores $s(w_1)$ and $s(w_2)$, which are the scores of $w_1$ and $w_2$, respectively; and (3) N features for the particular confusion set. In the example of FIG. 4, the value of $s(w_1)$ is greater than the value of $s(w_2)$.

Modified consensus hypothesis 520 comprises class values 523, 525 and 528, each of which corresponds to a confusion set. Each class value mathematically describes which candidate word is currently selected as the "best" candidate word in the confusion set to which it corresponds. Truth 530 comprises truth values 533, 535, and 538, each of which also corresponds to a confusion set. Each truth value indicates the actual word that is the correct word for the confusion set to which it corresponds.

An example is appropriate at this juncture. In the example of FIG. 3, entry 513 of FIG. 5, which corresponds to confusion set 310, is as follows: $w_1$="I"; $w_2$="–" (deletion); $s(w_1)$=whatever the posterior probability of $w_1$ is, which should be greater than $s(w_2)$; $s(w_2)$=whatever the posterior probability of $w_2$ is, which should be less than $s(w_1)$; and features $f_1$ through $f_N$ are whatever values they have been assigned. For instance, one feature could be the number of word candidates in the confusion set, which is two in this example. Entry 515 is as follows: $w_1$="have"; $w_2$="move"; $s(w_1)$=whatever the posterior probability of $w_1$ is; $s(w_2)$=whatever the posterior probability of $w_2$ is; and features $f_1$ through $f_N$ are whatever values they have been assigned. The rest of the entries in training set 510 are similarly determined.

When performing method 400 of FIG. 4, the modified consensus hypothesis 520 will initially be the vector {1, 1, 1, 1, 1} for the example of confusion network 300 of FIG. 3. This vector selects words {I, have, it, veal, fine}, each of which has the highest score in its confusion set. The truth 530 is {1, 1, 1, 2, 2}, which corresponds to the correct sentence, "I have it very often." As method steps 425 through 465 of method 400 are iterated, the system might learn the corrective rule "choose the second candidate if the first word is short with a posterior probability less than 0.54 and the second word is longer than the first word." Assume that the posterior probability of the word "fine" is less than 0.54. When this rule is applied to confusion network 300, the modified consensus hypothesis 520 becomes {1, 1, 1, 1, 2}, which corresponds to the sentence, "I have it veal often."

Thus, the present invention learns corrective rules that correct errors in speech recognition when consensus decoding is used during the recognition.

Figure 6:
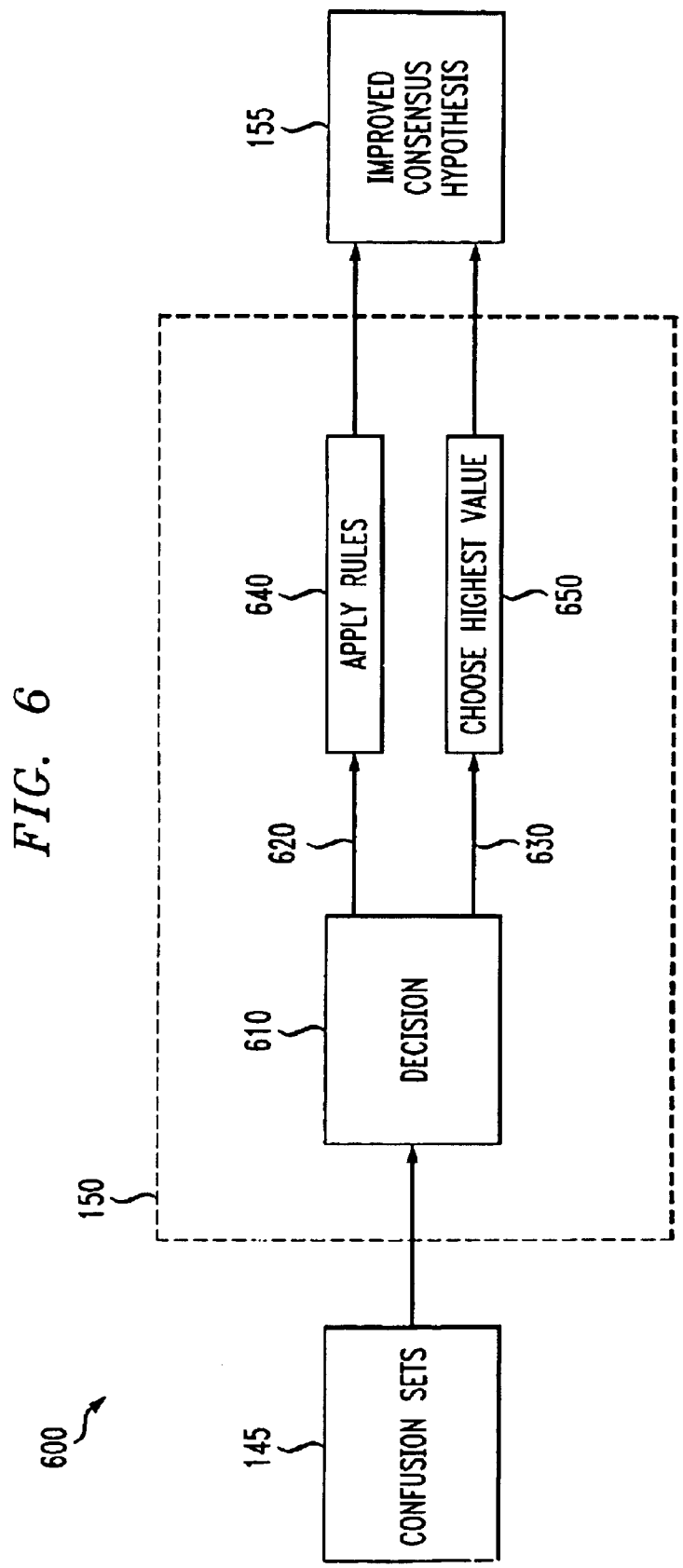
FIG. 6 is a block diagram of an exemplary error correction portion of the present invention, in accordance with one embodiment of the present invention.

Turning now to FIG. 6, this figure shows a block diagram of an exemplary error correction portion 600 of the present invention, in accordance with one embodiment of the present invention. Confusion sets 145 are determined through methods known in the art, and they are inputs to error correction mechanism 150. In this example, error correction mechanism 150 comprises decision block 610, apply rules block 640 and choose highest value block 650.

In this embodiment, the decision block 610 determines if the selected confusion set contains only one candidate word. If so, the confusion set is sent through path 630, where choose highest value block 650 selects the sole candidate word as the best candidate word. This best candidate word is output as an improved consensus hypothesis 155, which contains a concatenation of a number of best candidate words. This concatenation is the best guess by the speech recognition of an acoustic event.

Decision block 610 also determines if the posterior probability of the word with the highest score is greater than a predetermined probability. For particular speech recognition engines, when the highest ranked word has a posterior probability greater than 0.8, this word is correct in more than 92 percent of the cases for certain training sets. This percentage is hard to improve upon. Therefore, any confusion set having a highest ranked candidate word with a very high posterior probability is sent through path 630. The choose highest value block 650 selects the highest scoring candidate word as the best candidate word.

Decision block 610 sends the selected confusion set through path 620 when the highest scoring candidate word is not greater than a predetermined probability and when the confusion set contains at least two candidate words. The selected confusion set passes through path 620 to block 640, which applies the corrective rules previously generated in method 400 of FIG. 4. The potentially modified confusion set is then output as improved consensus hypothesis 155.

It should be noted that error correction mechanism 150 will depend on the characteristics of the speech recognition apparatus. For instance, corrective rules could be applied to all confusion sets 145.

Turning now to FIG. 7, a block diagram of a system 700 is shown for performing error correction for consensus decoding of speech. System 700 comprises a computer system 710 and a Compact Disk (CD) 750. Computer system 710 comprises a processor 720, a memory 730 and an optional video display 740.

As is known in the art, the methods and apparatus discussed herein may be distributed as an article of manufacture that itself comprises a computer-readable medium having computer-readable code means embodied thereon. The computer readable program code means is operable, in conjunction with a computer system such as computer system 710, to carry out all or some of the steps to perform the methods or create the apparatuses discussed herein. The computer-readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk, such as compact disk 750.

Memory 730 configures the processor 720 to implement the methods, steps, and functions disclosed herein. The memory 730 could be distributed or local and the processor 720 could be distributed or singular. The memory 730 could be implemented as an electrical, magnetic or optical memory, or any combination of these or other types of storage devices. Moreover, the term "memory" should be construed broadly enough to encompass any information able to be read from or written to an address in the addressable space accessed by processor 710. With this definition, information on a network is still within memory 730 because the processor 720 can retrieve the information from the network. It should be noted that each distributed processor that makes up processor 720 generally contains its own addressable memory space. It should also be noted that some or all of computer system 710 can be incorporated into an application-specific or general-use integrated circuit.

Optional video display 740 is any type of video display suitable for interacting with a human user of system 700. Generally, video display 740 is a computer monitor or other similar video display.

It is to be understood that the embodiments and variations shown and described herein are merely illustrative of the principles of this invention and that various modifications may be implemented by those skilled in the art without departing from the scope and spirit of the invention.

What is claimed is:

1. A method for correcting errors for consensus decoding of speech, the method comprising the steps of:

creating a confusion set comprising a plurality of candidate words, each of said candidate words having an associated score and corresponding to an acoustic event;

selecting a candidate word from the confusion set as a word recognized for the acoustic event, wherein a candidate word other than a candidate word having a highest associated score is selected when one or more criteria are met; and outputting the selected candidate word as the word recognized for the acoustic event.

2. The method of claim 1, wherein the step of selecting a candidate word further comprises the step of applying a rule to the confusion set, the rule determining which of the candidate words is selected.

3. The method of claim 2, wherein the step of applying further comprises the steps of:

applying the rule to the confusion set when a candidate word in the confusion set has a posterior probability that is not greater than a predetermined threshold, wherein the step of applying selects one of the candidate words in the confusion set; and selecting the candidate word having the posterior probability that is greater than a predetermined threshold when this candidate word has a posterior probability that is greater than a predetermined threshold.

4. The method of claim 1, further comprising the steps of:

determining a plurality of allowable transformations on a plurality of training confusion sets;

providing an objective function; and learning a plurality of corrective rules for the training confusion sets, the step of learning using the allowable transformations and objective function.

5. The method of claim 1, further comprising the step of learning when to select a candidate word other than a candidate word having a highest associated score.

6. The method of claim 1, wherein said associated score is a posterior probability.

7. The method of claim 1, wherein the step of selecting a candidate word further comprises the step of employing a data classifier.

8. The method of claim 7, wherein the data classifier is a decision-tree.

9. A method for determining a plurality of corrective rules from a plurality of training confusion sets, the method comprising the steps of:

determining a plurality of allowable transformations on the training confusion sets, each training confusion set comprising a plurality of candidate words determined from utterances of one or more individuals, wherein each candidate word in a training confusion set has an associated score;

providing an objective function; and learning a plurality of corrective rules for the training confusion sets, the step of learning using the allowable transformations and objective function, wherein at least one of the plurality of corrective rules selects, for a given training confusion set, a candidate word other than a candidate word having a highest associated score.

10. The method of claim 9 further comprising the steps of:

determining a real-time confusion set; and applying at least one of the corrective rules to the real-time confusion set.

11. The method of claim 10, wherein the real-time confusion set comprises a plurality of second candidate words, and wherein the step of applying further comprises:

determining if a highest scoring second candidate word has a posterior probability that is greater than a predetermined threshold;

applying at least one of the corrective rules to the real-time confusion set when the highest scoring second candidate word has a posterior probability that is not greater than a predetermined threshold, wherein the step of applying selects one of the second candidate words in the real-time confusion set;

selecting the highest scoring second candidate word having the posterior probability that is greater than a predetermined threshold when the highest scoring second candidate word has a posterior probability that is greater than a predetermined threshold; and outputting the selected second candidate word.

12. The method of claim 9, wherein the step of learning further comprises the steps of:

extracting a plurality of features from each of the training confusion sets, each of the features mathematically describing a characteristic of an associated one of the confusion sets.

13. The method of claim 12, wherein the features comprise one or more of the following:

word identity of at least one of the plurality of candidate words in a training confusion set;

duration of at least one of the plurality of candidate words in a training confusion set;

posterior probability of at least one of the plurality of candidate words in a training confusion set;

difference in posterior probabilities of two of the plurality of candidate words in a training confusion set;

temporal position of a training confusion set in a sentence comprising a plurality of training confusion sets; and number of the plurality of candidate words in a training confusion set.

14. The method of claim 2, wherein each of the allowable transformations comprises a template rule, wherein the step of learning further comprises the step of:

instantiating a plurality of template rules, each of the template rules having a form wherein one of the plurality of candidate words of a confusion set is selected if at least one predetermined criterion is met, each criterion comprising a selected feature, an operation and a threshold value for the selected feature.

15. The method of claim 14, further comprising the steps of:

providing a baseline predictor;

selecting a training confusion set;

determining which of the template rules are applicable to the selected training confusion set, whereby each applicable rule is a candidate rule;

determining values of the features in each of the at least one predetermined criteria, the values determined from the selected training confusion set;

scoring each of the candidate rules by using the objective function;

selecting a highest scoring candidate rule;

applying the highest scoring candidate rule to the baseline predictor to create a modified consensus hypothesis; and selecting the highest scoring candidate rule as a corrective rule.

16. The method of claim 15, wherein the method further comprise the step of providing a truth, the truth indicating a correct word for each of the training confusion sets, wherein the step of scoring comprises the steps of:

selecting a candidate rule;

for each of the training confusion sets, performing the following steps:

determining if the selected candidate rule chooses or does not choose a correct word, as determined from the truth, from the candidate words in the corresponding one of the confusion sets;

providing a value determined from a number of incorrect words selected subtracted by a number of correct words selected.

17. A system for correcting errors for consensus decoding of speech, comprising:

a memory that stores computer-readable code; and a processor operatively coupled to said memory, said processor configured to implement said computer-readable code, said computer-readable code configured to:

create a confusion set comprising a plurality of candidate words, each of said candidate words having an associated score and corresponding to an acoustic event;

select a candidate word from the confusion set as a word recognized for the acoustic event, wherein a candidate word other than a candidate word having a highest associated score is selected when one or more criteria are met; and output the selected candidate word as the word recognized for the acoustic event.

18. A system for determining a plurality of corrective rules from a plurality of training confusion sets, comprising:

a memory that stores computer-readable code; and a processor operatively coupled to said memory, said processor configured to implement said computer-readable code, said computer-readable code configured to:

determine a plurality of allowable transformations on the training confusion sets, each training confusion set comprising a plurality of candidate words determined from utterances of one or more individuals, wherein each candidate word in a training confusion set has an associated score;

provide an objective function; and learn a plurality of corrective rules for the training confusion sets, the step of learning using the allowable transformations and objective function, wherein at least one of the plurality of corrective rules selects, for a given training confusion set, a candidate word other than a candidate word having a highest associated score.

19. An article of manufacture for correcting errors for consensus decoding of speech, comprising:

a computer readable medium having computer readable code means embodied thereon, said computer readable program code means comprising:

a step to create a confusion set comprising a plurality of candidate words, each of said candidate words having an associated score and corresponding to an acoustic event;

a step to select a candidate word from the confusion set as a word recognized for the acoustic event, wherein a candidate word other than a candidate word having a highest associated score is selected when one or more criteria are met; and a step to output the selected candidate word as the word recognized for the acoustic event.

20. An article of manufacture for determining a plurality of corrective rules from a plurality of training confusion sets, comprising:

a computer readable medium having computer readable code means embodied thereon, said computer readable program code means comprising:

a step to determine a plurality of allowable transformations on the training confusion sets, each training confusion set comprising a plurality of candidate words determined from utterances of one or more individuals, wherein each candidate word in a training confusion set has an associated score;

a step to provide an objective function; and a step to learn a plurality of corrective rules for the training confusion sets, the step of learning using the allowable transformations and objective function, wherein at least one of the plurality of corrective rules selects, for a given training confusion set, a candidate word other than a candidate word having a highest associated score.

21. A system for correcting errors for consensus decoding of speech, comprising:

means for creating a confusion set comprising a plurality of candidate words, each of said candidate words having an associated score and corresponding to an acoustic event;

means for selecting a candidate word from the confusion set as a word recognized for the acoustic event, wherein a candidate word other than a candidate word having a highest associated score is selected when one or more criteria are met; and means for outputting the selected candidate word as the word recognized for the acoustic event.

22. A system for determining a plurality of corrective rules from a plurality of training confusion sets, comprising:

means for determining a plurality of allowable transformations on the training confusion sets, each training confusion set comprising a plurality of candidate words determined from utterances of one or more individuals, wherein each candidate word in a training confusion set has an associated score;

means for providing an objective function; and means for learning a plurality of corrective rules for the training confusion sets, the step of learning using the allowable transformations and objective function, wherein at least one of the plurality of corrective rules selects, for a given training confusion set, a candidate word other than a candidate word having a highest associated score.

* * * * *

UNITED STATES PATENT AND TRADEMARK OFFICE
CERTIFICATE OF CORRECTION

PATENT NO. : 6,859,774 B2
DATED : February 22, 2005
INVENTOR(S) : Mangu et al.

It is certified that error appears in the above-identified patent and that said Letters Patent is hereby corrected as shown below:

Column 5,
Line 28, before "$v_1$" and after "$A_1$" replace "op" with -- $op_1$ --.

Column 10,
Line 34, before "wherein" and after "claim" replace "2" with -- 12 --.

Signed and Sealed this

Thirteenth Day of September, 2005

JON W. DUDAS
*Director of the United States Patent and Trademark Office*